US010652333B2

(12) United States Patent
Wouhaybi et al.

(10) Patent No.: US 10,652,333 B2
(45) Date of Patent: May 12, 2020

(54) NORMALIZATION OF SENSORS

(71) Applicant: INTEL CORPORATION, Santa Clara, CA (US)

(72) Inventors: Rita H. Wouhaybi, Portland, OR (US); Bradford H. Needham, North Plains, OR (US); Igor Tatourian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 389 days.

(21) Appl. No.: 15/391,479

(22) Filed: Dec. 27, 2016

(65) Prior Publication Data

US 2018/0183661 A1 Jun. 28, 2018

(51) Int. Cl.
*G01D 18/00* (2006.01)
*H04L 29/08* (2006.01)
*H04L 12/66* (2006.01)

(52) U.S. Cl.
CPC ............. *H04L 67/12* (2013.01); *G01D 18/00* (2013.01); *H04L 67/1097* (2013.01); *H04L 12/66* (2013.01); *Y04S 40/18* (2018.05)

(58) Field of Classification Search
CPC ..... G01D 18/00; H04L 67/1097; H04L 12/66; H04L 67/12; Y04S 40/18; G05B 15/02; G05B 19/042; G05B 19/4093; G05B 19/41855; G05B 19/41865; G05B 19/41875; G05B 2219/31265; G05B 2219/31337; G05B 2219/31435; G05B 2219/31457; G05B 2219/32129; G05B 2219/32194; G05B 2219/32196; G05B 2219/32201; G05B 2219/32404; G05B 2219/33209; G05B 2219/35095; G05B 23/0221; G05B 23/0235; G05B 23/0243; G05B 23/0254; G05B 23/0286;
(Continued)

(56) References Cited

U.S. PATENT DOCUMENTS

2012/0289804 A1 11/2012 Yao
2015/0019553 A1 1/2015 Shaashua et al.
(Continued)

FOREIGN PATENT DOCUMENTS

WO 2013104006 A2 7/2013

OTHER PUBLICATIONS

G. Monte et al., Standard of Things, First Step: Understanding and Normalizing Sensor Signals, 2013, IEEE, pp. 118-123.*
(Continued)

*Primary Examiner* — Mischita L Henson
(74) *Attorney, Agent, or Firm* — Internaional IP Law Group, P.L.L.C.

(57) ABSTRACT

Systems and methods for sensor normalization are described. An example of a method includes receiving a first value of a characteristic measured by a first sensor of a first sensor type, and receiving a second value of the characteristic measured by a second sensor of a second sensor type that is more accurate than the first sensor type. A normalization for the first sensor is determined based on the first value and the second value, wherein the normalization alters a response equation of the first sensor. Normalizing another sensor of a same time as the first sensor, based, at least in part, on the normalization.

25 Claims, 10 Drawing Sheets

(58) Field of Classification Search
CPC .... G05B 23/0294; Y02A 90/22; Y02A 90/26; Y02P 90/185; Y02P 90/20; Y02P 90/22; Y02P 90/265; Y02P 90/86; G06K 9/6253; G06K 9/228; G06K 9/00288; H04N 1/00307; H04N 2101/00; H04N 2201/3278; H04N 5/23219; G06F 17/30879

See application file for complete search history.

(56) References Cited

U.S. PATENT DOCUMENTS

| | | |
|---|---|---|
| 2015/0134954 A1 | 5/2015 | Walley et al. |
| 2016/0370334 A1 | 12/2016 | van Tol |
| 2017/0004692 A1* | 1/2017 | Britt .................. H04L 12/413 |

OTHER PUBLICATIONS

G. Monte et al., Normalizing Transducer Signals: An Overview of a Proposed Standard, 2014, IEEE, pp. 1-6.*

PCT International Search Report, PCT Application No. PCT/US2017/062273, dated Mar. 30, 2018, 4 pages.

\* cited by examiner

400

500

US 10,652,333 B2

NORMALIZATION OF SENSORS

TECHNICAL FIELD

The present techniques relate generally to sensors and, more particularly to normalization of sensors including Internet of Things (IoT) sensors.

BACKGROUND

Sensors have proliferated in public, industrial, commercial, and private environments. Sensors may sense and measure characteristics of objects and environmental parameters, other features, and so on. Large amounts of data are collected via the sensors. Furthermore, the Internet of Things (IoT) may bring Internet connectivity to as many as 50 billion devices by 2020. For organizations, IoT devices may provide opportunities for monitoring, tracking, or controlling other devices and items, including further IoT devices, other home and industrial devices, items in manufacturing and food production chains, and the like.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
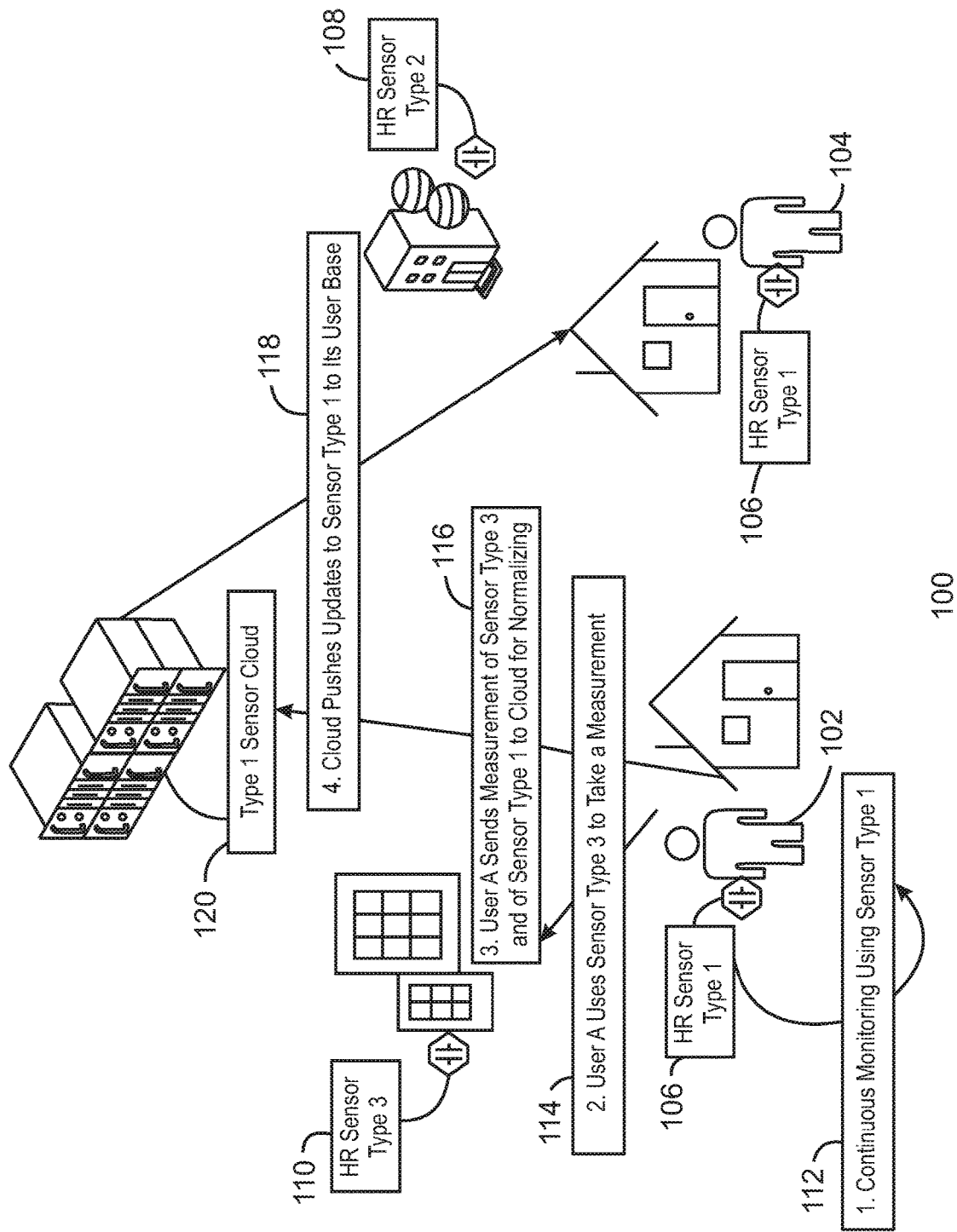
FIG. 1 is a drawing of a system employing multiple sensors in accordance with embodiments of the present techniques.

The present techniques are generally directed to normalization of sensors including IoT sensors. As discussed below, aspects may involve crowdsourcing of sensor normalization to increase accuracy of the sensor. The IoT sensors can be less accurate, less expensive, use less power, and be more prone to losing accuracy as compared to other sensors including more conventional sensors. The IoT sensors may be calibrated initially by the manufacturer. However, when the operating IoT sensors lose accuracy over time, a recalibration of deployed IoT sensors can be impractical or inefficient. Thus, embodiments herein provide for normalizing the IoT sensors based on a comparison to measurements by another sensor such as a more accurate sensor.

Normalization or normalizing a sensor may be to adjust the sensor response based on comparison to a same measurement by another sensor. In contrast, calibration may be calibrating or designating a sensor response against or based on a known standard or the ground truth (e.g., a direct observation instead of inference). Calibration may involve to measure the output of a sensor in response to an accurately known calibration standard as an input. Normalization may be a degree of best effort. The normalization may adjust sensor response equations, curves, plots, graphs, charts, coefficients, offsets, ratios, slopes, etc.

In some examples, a computing system may determine normalization of a first sensor based on a combination of a measured value of a characteristic measured by the first sensor and a measured value of the characteristic measured by a second sensor more accurate than the first sensor. The normalization may be sent to the first sensor to alter response features (e.g., a response equation) of the first sensor. A response feature or equation may be sensor output as a function of sensor input.

Moreover, in certain examples, multiple first sensors (e.g., IoT sensors) may be in operation and measure the characteristic more frequently than the second sensor. The first sensors, while less precise and/or less accurate than the second sensor, may be inexpensive compared to the second sensor and may consume less power than the second sensor in some examples. Thus, shifting the more frequent measurements to the first sensors, and using the second sensor less frequently (for validation or normalization) may save power. Indeed, offloading to sensors using less power may save power. For power supply, sensors may rely on batteries, wireless power transmission, parasitic power harvesting (such as through motion, wind, or solar power), or be plugged into an electrical outlet, and the like.

Lastly, the computing system deriving or determining the normalization may be a cloud computing system (e.g., server or distributed computing system), or an IoT gateway device (e.g., aggregation device, edge device, fog device, etc.), a smart sensor, and so on. Normalization models may be developed and/or imported or copied from other systems, and involve self-tuning, self-normalization, and the like. As indicated, the normalization may be pushed to the first sensors. The normalization may also be sent to sensors of another user of the first sensor type and manufacturer.

With the spread of IoT and sensors in industrial, retail, and consumer space, redundant sensing is becoming the norm rather than the anomaly. As the sensors become inexpensive, suppliers continue to add more physical sensors to the same package or enclosure. Consequently, the same or similar physical characteristics may be measured and reported at the same time from multiple sources (sensors). Further, even if not at the same time, the measurements from more than one sensor may be close or similar in time giving a reasonable assumption is certain cases that the same physical entity was measured.

In general, the list of characteristics measured by sensors may continue to grow as technology and time advances. In one example, when a user goes for a run, their phone and wearable(s) may measure and compute multiple physical characteristics such as run distance, calories burned, heart rate, steps, and so forth. Some measurements are produced and reported by one device or sensor while other measurements could be performed by multiple devices or sensors. Such measurements in this example may include calories burned reported by the mobile phone and wearable, and heart rate reported by a wrist-based wearable and maybe a chest strap, and the like. Sensed data come from a physical sensor (e.g. for heart rate) while other sensed data may be based on a fusion of multiple sensors and predefined models (e.g. for calories burned).

Moreover, some sensors may be more accurate than other sensors. Indeed, not all sensors are created equal with respect to accuracy. Sensors may be subjected to a calibration phase where, for example, plots describing sensor characteristics and response equations to different environmental and physical inputs are generated. The physical sensors may be mass produced and delivered with the response plots. These plots may be based on samples performed in a laboratory where operation environments are typically somewhat ideal and controlled. Hence, response plots may vary from sensor response in environments outside of the lab such as in households, farming fields, under the sea, factory floors, closed elevator environments in smart buildings, and so on. In the laboratory, the atmosphere may be relatively free from contaminants, the temperature relatively stable, the area free from vibration, and personnel specialized in handling the equipment. In contrast, sensors in the commercial, public, or industrial environments may be subject to challenging conditions. Indeed, an industrial measure is often made under adverse conditions. Moreover, outside of the laboratory, signal transmission over long distances and electrical noise may be induced.

As for calibration, calibration may be beneficial because the relationship between data (e.g., weight, temperature, pressure, etc.) from a sensor and the measured parameter are often non-linear. However, calibration may be complex due to variations and can be more of an art or trial-and-error process. Further, initial calibration can end with an approximation that is static. Yet, in many cases, calibration may not be required. Indeed, normalization among sensors may be implemented, including when the user or system has access to multiple types of sensors with ranging quality and accuracy.

Example applications may involve a vehicle where data from vehicle sensors are employed by the vehicle (e.g., by an engine control unit or ECU) to control, for instance, steering or breaking. That data may generally be transmitted over an untrusted network and can be spoofed as has been shown by security researchers. Therefore, binding measurements to ground truth can be beneficial. That is, data from less precise sensors may be used over a channel not as susceptible to attack for establishing bounds on actuation. For example, while a signal from a more precise sensor such as a global positioning system (GPS) may be more susceptible to spoof, the signal from a less precise sensor such as an inertial sensor can be used to alert the system if the positioning data is at significant disagreement between the GPS and the inertial sensor. Ground truth may refer to information provided by direct observation as opposed to information provided by inference.

In general, a technique may include to link measurements performed at the same or similar time of the same physical objects or characteristics by two or more sensors, including with the two sensors being of different type. If the measurements by the two respective sensors are not exactly at the same time, the measurements may be close enough in time such that treating the measurements as taken at the same time may be reasonable. This linking of measurements by two sensors may provide for attesting that the same object or parameter has been measured by the two or more sensors to note the relationship between the data from the two respective sensors has not changed. Moreover, this linking may facilitate generation of a database (e.g., quality database) storing knowledge of which of the two sensors has a higher quality data output. If the values reported by the sensors differ, the higher quality sensor may be used to normalize the response equation of the lower quality sensor. Further, a cloud or cloud computing system may distribute the adjusted normalization so that related lower-quality sensors could improve the quality of their reported measurements.

Embodiments may bound sensors to ground truth based on measurements by other sensors. In addition, in certain embodiments, a reduction of power utilization may be realized based on whether a more or less precise measurement is satisfactory in the application context. Further, a background calibration or normalization service may be generated to aid training systems that combine data from these many sensors. In all, sensor calibration and normalization may be implemented.

One example related to health monitoring may leverage existing and/or new systems to improve accuracy of sensing. In this hypothetical example, a person Joe is interested in getting into shape. Joe is monitoring several aspects of his health using a fitness watch, smartphone app(s), a smart scale, and an additional suite of sensing. Joe also installed a set of weight sensors to his office chair. He is hoping that the various sensors aid his understand his snacking habits and how his snacking habits could affect his weight and training. In addition, he visits his primary care physician once a year for a check-up.

In this example, our user Joe has his weight measured in at least three different touch points: the smart scale, the weight sensors in his office chair, and the scale at the doctor's office. From a data integrity perspective, the doctor's scale is probably the most accurate with some guaranteed data precision. The smart scale might be a single sensor that is more tightly calibrated and because the smart scale is likely connected to the cloud, the scale manufacturer might push a calibration patch to the smart scale on a regular basis. The weight sensors or scales (likely inexpensive and off-the-shelf) that Joe installed in his office chair might be less accurate or precise, and less likely to receive a manufacturer calibration path. Thus, in order to address the noise and continuous use on the inexpensive sensors in the office chair, the technique may identify that the sensors at the three touch points are measuring the same physical entity (Joe). The technique may use data from each sensor to calibrate or normalize sensors. The linking of sensors and the associated normalization may account for noise, drift, data creep, and other problems arising with low-cost sensors such as the inexpensive weight sensors installed in the office chair.

Without such normalization, if Joe merges the weight data from his chair, smart scale, and doctor's scale, Joe may thus accept sometimes wide variations (e.g., in weight gain and loss) in his merged data that may not reflect reality. For example, there may be a constant offset (e.g., two pounds) between the smart scale and the office chair. Joe could address lack of the aforementioned normalization by using only one sensor rather than merging data, or Joe could manually measure (calibrate) each scale to some Gold Standard and manually apply corrections to each weight measurement device's data before merging. A Gold Standard may be a test or measure of comparison that is considered ultimate or ideal. As discussed, calibration may be comparison of sensor output to a known standard, whereas normalization may be comparison of sensor output to output of another sensor. In the above example, the scale in the doctor's office may be more readily available for calibration such as via weighing a set of weights with known precise values. The sensors in the office chair may be normalized when compared to measurements by the doctor's scale.

Embodiments herein may calibrate and/or normalize. The normalization may include automatic or semi-automatic normalization of the sensors to each other, applying a correction to each sensor's data so that the data from multiple sensors can be sensibly merged into a single time-varying signal, for example. In industrial settings, calibration of a given sensor may be typically done by periodically using the sensor to measure a highly-controlled and accurate signal or other physical property. For example, a commercial scale is calibrated by placing calibration weights on the scale and adjusting the output until it is within specified tolerances. Similarly, a volt meter is calibrated by using it to measure the output of a highly-accurate voltage source. Embodiments herein may replace or add to this practice by comparing sensor outputs to those of a more-or-less arbitrarily chosen "standard" sensor or an aggregate from a set of sensors.

Sensors in the user environment may be normalize (e.g., constantly) to other sensors by the user, technical service, sensor manufacturer, computing devices, and the like. The other sensors may include state-of-the-art hardware which might be out-of-reach or exceed budget of the user base. Yet, the users employing the lower-quality inexpensive sensors having occasional access to high quality sensor measurements can use the high-quality measurements to normalize the inexpensive sensors in order to provide better quality measurements of the inexpensive sensors.

FIG. 1 is a system 100 employing multiple sensors. The illustrated example depicts a User A (user 102) and a User B (user 104), and in which the sensors are heart rate (HR) sensors. In this example, the sensors are three respective types: HR Sensor Type (1) 106, HR Sensor Type (2) 108, and HR Sensor Type (3) 110. For instance, HR Sensor Type (1) 106 may be worn on user 102's wrist, HR Sensor Type (2) 108 may be in user 102's doctor's office, and HR Sensor Type (3) 110 may be in user 102's office. The system 100 as illustrated gives an example of occasional use of high quality sensors 108 and 110 to improve or increase accuracy of lower quality sensors 106. In this example, sensors used to normalize each other are measuring the same type of data (e.g., heart rate).

Looking at FIG. 1, it can be assumed that the heart-rate sensors 106 of Type I are of lower quality than the sensors 108 or 110 that are Type 2 or Type 3. Advantageously, the sensors 106 could be inexpensive and low power in that the sensors 106 are embedded in a consumer wearable. Also, the sensors 106 could take measurements at a high frequency (e.g., several times a minute). When the user 102 takes an occasional measurement (or a series of measurements) using sensor 108 (Sensor Type 2) or sensor 110 (Sensor Type 3), then the overlap in measurements between their sensor 106 with the sensor 108 and/or 110 could be used to normalize their own sensor 106 of Type 1. In addition, this normalization may be pushed to the cloud and used to adjust the sensor model for Sensor Type 1, and the update deployed on other users' sensors 106 such as for the user 104. In other words, even occasional access to a higher quality sensor 110 by one user could impact the measurements and the subsequent values that all sensors 106 of the same type deployed.

In operation, the users 102 and 104 may employ 112 their sensors 106 (Type 1) for continuous or semi-continuous monitoring of heart rate. Further, in this example, the user 102 may rely 114 on a sensor 108 (Type 2) or a sensor 110 (Type 3) to measure their heart rate. Then, the user 102 may send 118 the measurements of the sensor 106 and the sensor 108 and/or 110 to a computing device for normalizing the sensor 106. In a particular example, the computing device is a cloud computing device. Thus, normalizing updates may be sent 118 from the cloud 120 (e.g., a Type 1 sensor cloud) to sensors that are sensors 106 (Type 1) in the user base. A computing device in the cloud 120 may be a central entity that collects the normalization and sends the normalization to other users. Lastly, in certain examples, a user may communicate the normalization to another user without the normalization being routed through the cloud 120 or central entity.

Even though the example of system 100 is in the consumer space, such a system could be used and deployed in other settings such as industrial, retail, smart buildings, and cities, and so on. In industrial settings and other settings, the system architecture could accommodate, for example, a server set on premises. Such a server might be beneficial to protect the data privacy (which might otherwise leak industrial secrets) and promote that the system owner or associated manufacturer are the ones benefiting from the high-quality measurements and depriving competitors from these measurements.

Note also that though the example of FIG. 1 targets a user biometric measurement, the present techniques also apply to other measurement types and features such as environmental data or other physical properties. Similarly, the technique could apply to virtual, composed, or fused sensors, and so forth. The systems may generally benefit from a combination of higher quality sensors and procedures or algorithms for normalization of lower quality sensors.

In addition, sensor normalization could vary or differ based on the physical item measured. For example, consider a weight sensor, due to the non-linear characteristics of springs and other physical components, adjusting the response equation may take into consideration the item being measured and where the item falls in the range of objects that could be measured using the sensor. For example, with a child weighing under 40 pounds (lbs) weighed at a doctor's office, the technique may adjust the scale response time for light weights rather than the entire equation for all weights.

Another consideration that the technique may accommodate is measurements not occurring at the same time may be utilized for normalizing the sensors rather than dismissing the measurements occurring at different times. Therefore, for instance, if a user weighs themselves several times using their bathroom scale to give multiple data points over time, a plot may be extracted that characterizes the user weight variations throughout the day. When that user visits their doctor's office, the user may be weighed with a scale that is of better physical characteristics and quality than the user bathroom scale. This reported weight value generated at the physician's office is not simultaneous to the weight measurements taken at home but can be mapped to the expected value at that point of time via the plot. Thus, the two scales can be normalized by adjusting the lower quality scale to align with the higher quality sensor.

If a sensor participating in the system does not have communication and recording capability to send measurements to the cloud, the sensor can be retrofitted to send measurement data. Also, the sensor may be retrofitted with an external camera that records the reading, extracts the value, and sends the measured value to the cloud computing system in the cloud. Adjustment of the response equation of such an old device in certain examples may use Augmented Reality (AR) to project a virtual screen on top of the real screen and verify the latest adjusted value.

Moreover, embodiments may determine which sensor type is of higher quality, such as when an older expensive sensor becomes lower quality than a newer sensor. In some examples, users contribute a rating to the accuracy of the sensor. Such ratings may facilitate crowd-sourcing and determining which sensors are reliable and higher quality. Further, a series of known measurements may be performed to verify results on a regular basis. Such ratings and known measurements may be used to adjust ranking of sensor reliability and accuracy. The testing protocol with respect to known measurements may be dependable such as with specific pre-weighed sensors. Furthermore, machine learning may be employed to evaluate sensors.

Figure 1A:
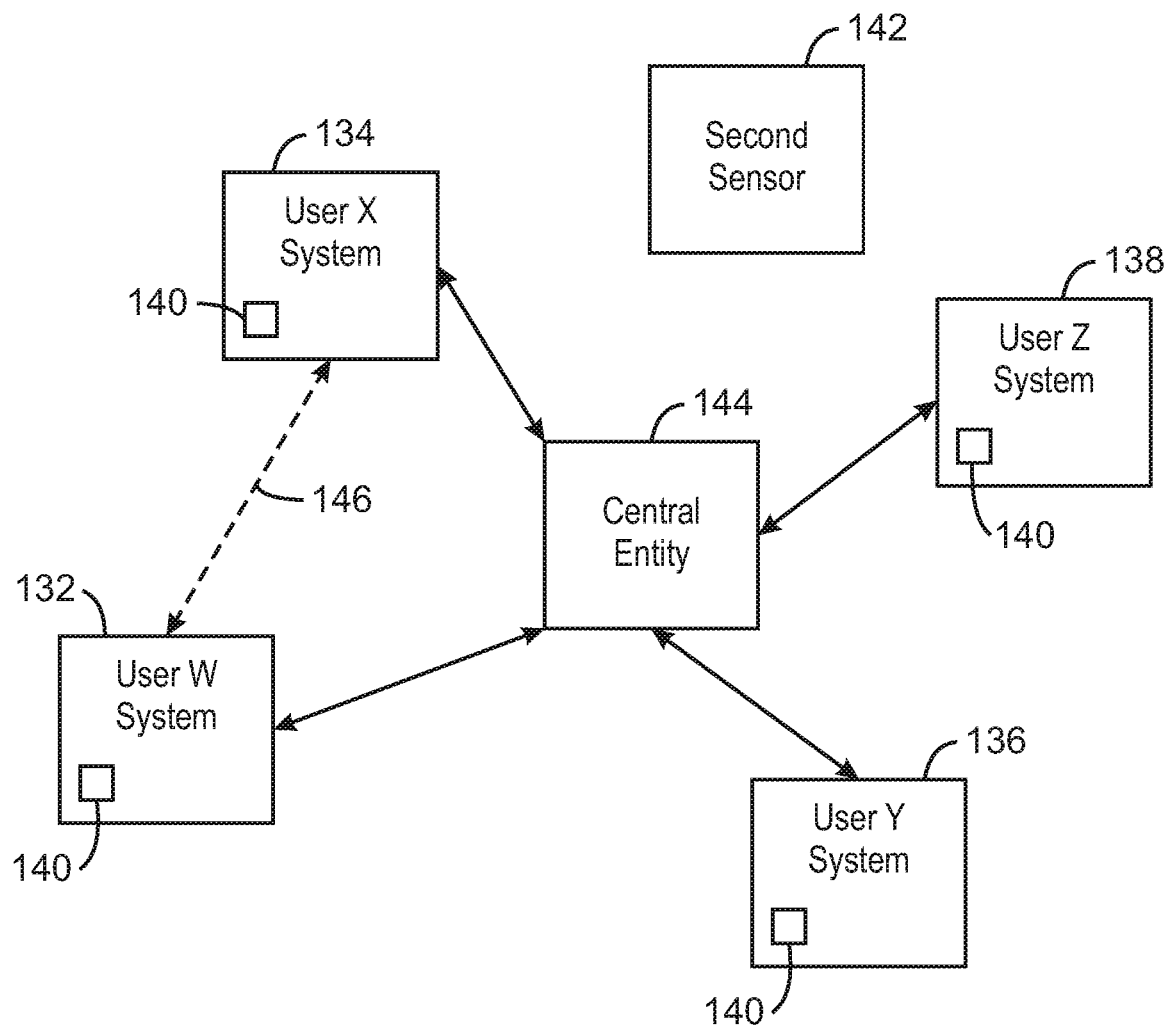
FIG. 1A is a block drawing of a system that implements crowdsourcing of normalization in accordance with embodiments of the present techniques.

FIG. 1A is a system 130 that implements crowdsourcing of normalization. Such may facilitate a lower quality sensor to be normalized even if the owner of that lower quality sensor does not have access to a higher accuracy sensor. In other words, the normalization may come from another owner who also owns a lower quality sensor of the same type and is able to obtain a measurement from a higher accuracy sensor. The other owner having access to the higher accuracy sensor normalizes his lower accuracy sensor. Further, the normalization propagates to lower accuracy sensors of the same type of the first owner and of the owner base generally.

The system 130 indicates four owners or users (User W, User X, User Y, User Z), though the user base can number in the hundreds or thousands of users. The respective systems 132, 134, 136, 138 of the four users each have first sensors 140 of the same or similar type. Indeed, each user may have multiple first sensors 140 and which may be IoT sensors. One or more of the user systems 132, 134, 136, 138 have access to a second sensor 142 that is more accurate than the first sensor 140.

In a particular example, the user system 132 has access to the second sensor 142, and the other user systems 134, 136, 138 do not have access to the second sensor 142. Thus, in this particular example, the user system 132 may determine a normalization for their first sensor(s) 140 using a measurement(s) by the second sensor 142. The user system 132 may normalize their first sensor 140 with the determined normalization. The user system 132 may also make the normalization available for normalizing first sensors 140 of other users, e.g., in user systems 134, 136, 138 and to the user base of the first sensor 140 type generally. The normalization may be an altering a response equation of the first sensors 140.

In the illustrated example, a collection or central entity 144 may receive the normalization from the user system 132 and distribute the normalization to the other user systems 134, 136, 138. Indeed, the central entity 144 may propagate the normalization to the user base of the first sensors 140. The central entity 144 may be a cloud computing system, a manufacturer or service provider of the first sensors 140, and so on. The central entity 144 may have code stored in memory and executed by a processor to distribute the normalization and to adjust the normalization for specific respective conditions of the first sensors 140 among the various users. The executed code may provide for the central entity 144 to collect multiple normalizations and intermittently send batch updates of the normalization to the users. The code may also provide for the central entity 144 to assist the user 132 in the determination of the normalization using the measurement of the second sensor 142. Lastly, in certain examples, the user 132 may communicate the normalization to another user (e.g., user 134), as indicated by the dashed arrow 146, without the normalization being routed through the central entity 144.

Figure 2:
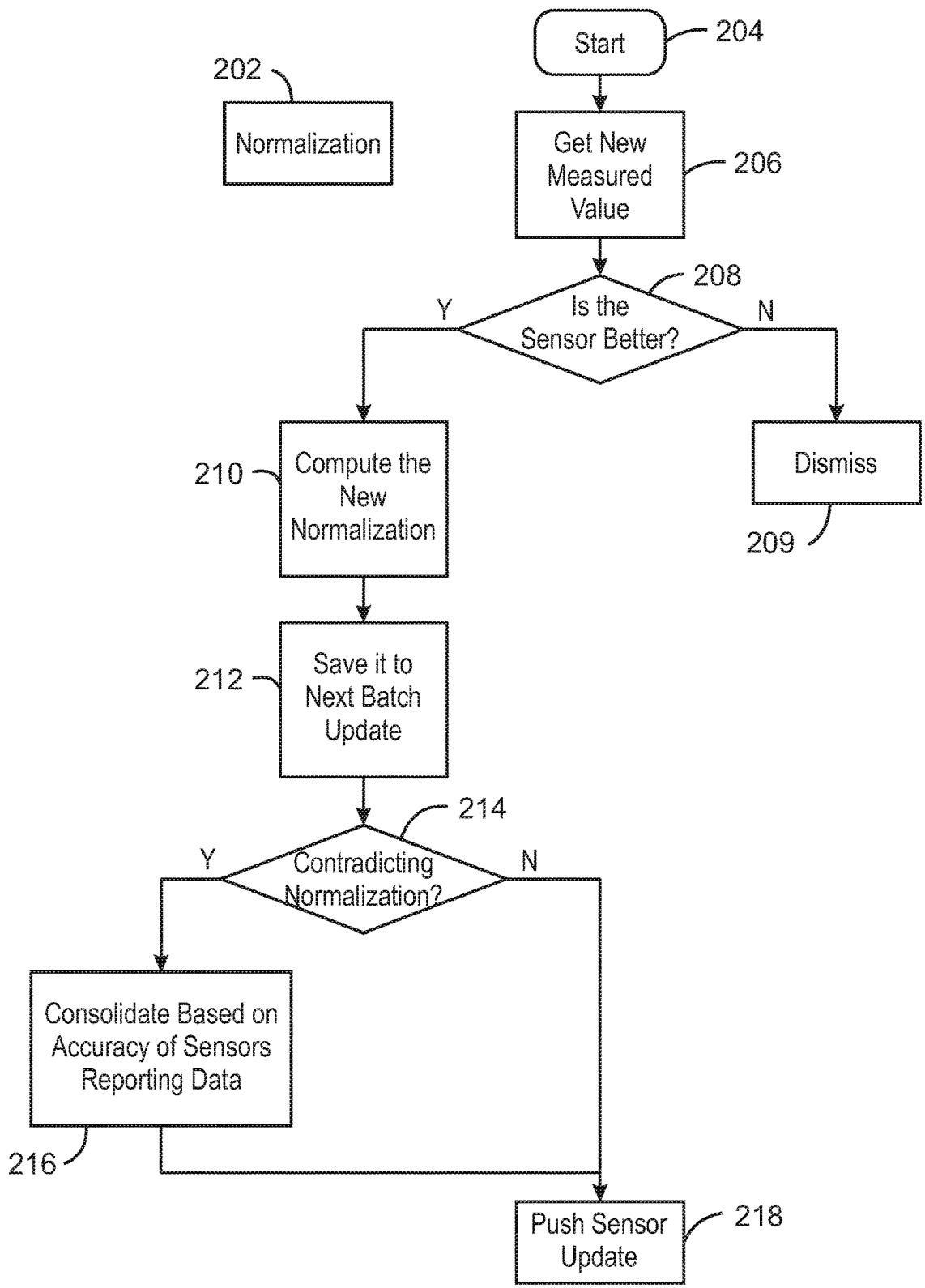
FIG. 2 is a block flow diagram of a method for sensor normalization in accordance with embodiments of the present techniques.

FIG. 2 is a procedure or method 200 for sensor normalization 202 and updates. At block 204, the method starts. At block 206, a new measurement value from a sensor is received. At block 208, the method notes if the sensor is a higher quality sensor (e.g., more accurate sensor) than the lower quality sensors being normalized. If not, the new measurement value is dismissed 209 from the normalization. If yes, then at block 210, a new normalization is computed. At block 212, the new normalization is saved for the next batch update of normalization to the lower quality sensors. The update of normalization may address the oscillation and drift of data generated by the low-quality sensors. However, if at block 214, the new normalization contradicts the existing normalization, the normalization is first consolidated at block 216 based on accuracy of the sensors reporting data before the normalization is pushed at block 218 to the lower quality sensors. In examples, the measured values from the more accurate or higher quality sensors may be utilized instead of a mean value, for example, from the multiple types of sensors.

At block 208, the method noting if the sensor is a higher quality sensor (e.g., more accurate sensor) than the lower quality sensors being normalized may involve retrieving measurements and quality ranking from another sensor(s). Such may facilitate determining if a sensor is ranked lower quality than the sensor(s) the measurements were retrieved. In other words, in some examples, a device compares its sensor's quality ranking with other sensors' measurements the device has access. Then, the device uses its measurements and measurements of other sensors to calculate a mapping for its measurements.

Moreover, normalization can be determined and performed generally at any time one or more readings from one sensor can be numerically compared to readings from at least one other sensor. In examples, the readings do not have to be coupled in time to the taking of a local measurement. The method 200 may include distinct actions: first calculating and updating a compensation function for the local sensor; and second taking a measurement from the local sensor, applying that compensation function, and publishing the resultant measurement.

To normalize a low-precision sensor based on known drift over time and on a more accurate or more precise sensor may be implemented. However, the more accurate or more precise sensor may have malfunctioned. A high-precision or high-accuracy sensor may initiate a series of self-tests to verify that it is working correctly. The high-precision or high-accuracy sensor may reset itself to the trusted state, for example, via its non-volatile memory (NVM) if available.

In some examples, the overall system may not know which sensor to trust. If the measurements disagree among sensors, the system may vote for the majority of sensors within range while only one sensor gives bad data. If there are only two sensors and they disagree, then the system or one of the sensors may notify a person or other system, and a sensor attempt to recalibrate itself by external environmental means. For example, if GPS and inertial systems disagree on measured position, stars could be used if the sky is clear, or cell tower signals received via cell channels if possible, to decide or vote whether the GPS or inertial system is accurate, and for the GPS or inertial system to recalibrate itself.

It should be noted that while the system may vote for the majority of sensors, some embodiments may other group-weighting or decision processes, such as a best-fit approximation of the set of sensors data and so forth. In other words, embodiments and implement decision-making other than majority vote. Indeed, the decision may be based on generally reducing multiple, differing values to a single value.

As for sensors in general, sensors may produce a measurable signal in response to a stimulus. A sensor may include or be associated with a transducer device that converts one form of energy into another form of energy. A transducer may be a device that converts a signal from one physical form to a corresponding signal having a different physical form. Physical forms may be mechanical, thermal, magnetic, electric, optical, chemical, and so on. A sensor may be an input transducer (e.g., microphone) and an actuator may be an output transducer (e.g., loudspeaker). A sensor may be a device that receives and responds to a signal or stimulus. In general, with a sensor, a sensing or sensitive layer or medium responds to the external stimulus and the transducer may convert the response into an external measurable quantity. A sensor may be or include a detector that indicate presence of a parameter or object. In operation, a sensor may monitor and quantify changes in the measured parameter or object.

Features or characteristics of sensors may be static or dynamic, and these sensor parameters may map output versus input. Sensor characteristics may include accuracy, error, precision, resolution, sensitivity, selectivity, noise, drift, detection limit, repeatability, reproducibility, hysteresis, stability, response time, range or span, offset, and so forth. Accuracy of a sensor may be how correctly the sensor output represents the true value, how well the sensor measures the environment in an absolute sense, and/or how good the sensor measured data compared with a recognized standard, and the like. Drift may be a gradual change in the sensor's response while the measured object or parameter remains the same. In some examples, dynamic characteristics of sensors may be determined by analyzing the response of a sensor to a family of variable input waveforms (e.g., impulse, step, ramp, sinusoidal, white noise, etc.). Mathematical representations for sensors or sensing systems may be linear, nonlinear, time invariant, time dependent, and so on. An output characteristic curve versus input of physical parameter may give detectable output changes for the sensors. In general, for some examples, a sensor response may be an output change versus an input parameter change.

Figure 3:
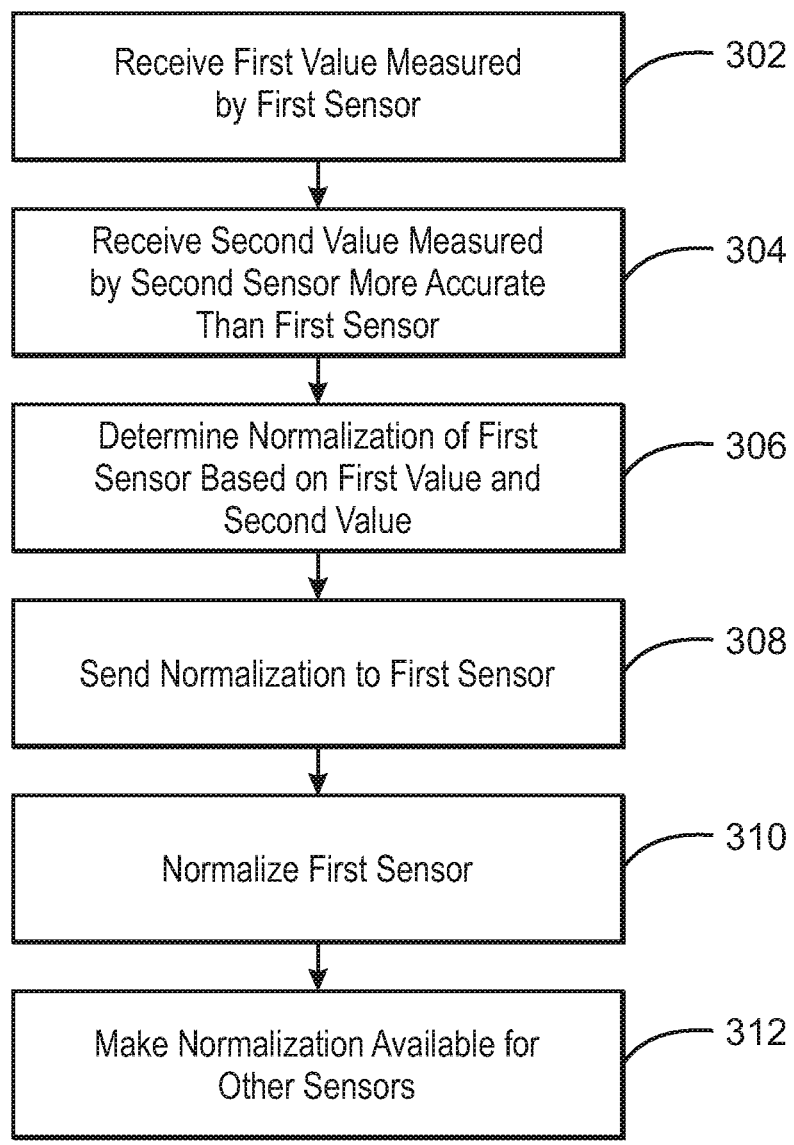
FIG. 3 is a block flow diagram of a method for sensor normalization in accordance with embodiments of the present techniques.

FIG. 3 is a method 300 of sensor normalization by a computing system. At block 302, the method includes receiving at the computing system a first value of a characteristic measured by a first sensor. The characteristic measured may be an environmental parameter or a feature of a physical object, and the like. At block 304, the method includes receiving at the computing system a second value of the characteristic measured by a second sensor more accurate than the first sensor. The second value may be measured by the second sensor at the same or similar time as the first value measured by the first sensor. Moreover, the first sensor may be less expensive and consume less power than the second sensor. Also, the first sensor may measure the characteristic more frequently than the second sensor. In some examples, there are multiple first sensors, such as IoT sensors, employed to measure the characteristic. The number of IoT sensors in a particular environment can number in the thousands or more. At block 306, the method includes determining by the computing system a normalization for the first sensor based on the first value and the second value, wherein the normalization to alter a response equation of the first sensor. The response equation may give the sensor output as a function of sensor input, or may be a similar equation, function, or curve, and the like. The determining of the normalization that alters the response equation can involve various calculations for different portions of the value range.

At block 308, the method includes sending the normalization to the first sensor. The normalization may be sent, for example, via another computing device or a gateway device in an IoT system, and the like. Further batch normalization or updates may be performed in that determined normalizations over time may be collected and sent together. At block 310, the method includes normalizing the first sensor by altering the response equation per the normalization.

At block 312, the method includes making the normalization available for other sensors (e.g., owned by other users) of the same or similar type as the first sensor. The method may include sending the normalization to a central entity, and the central entity pushing the normalization the other sensors of other users. In other words, a central entity (e.g., cloud computing system, manufacturer, service provider, etc.) can use the normalization from a system having first sensor for an initial user, and provide the normalization to relevant sensors (e.g., same type as first sensor) for another user(s) in another system(s).

The method 300 may provide for the central entity to collect multiple normalizations and intermittently send batch updates of the normalization to the users. The method 300 may also provide for the central entity to assist the user in the determination of the normalization using the measurement of the second sensor 142. Lastly, in certain examples, the users may communicate the normalization to another user without the normalization being routed through the central entity.

Lastly, it should be noted that determining the normalization that alters the response equation may include accounting for known differences in the sensors, conditions of the sensors such as temperature, humidity, age of sensor, previous drifting behavior, etc. The data related to the object being sensed considered may include time difference between the two measurements (e.g., the aforementioned first value and second value), expected value for variation (e.g., dependent on the time lapse), range of the object in terms of the expected accuracy of sensors in question, and other environmental and behavioral data, and so on.

Figure 4:
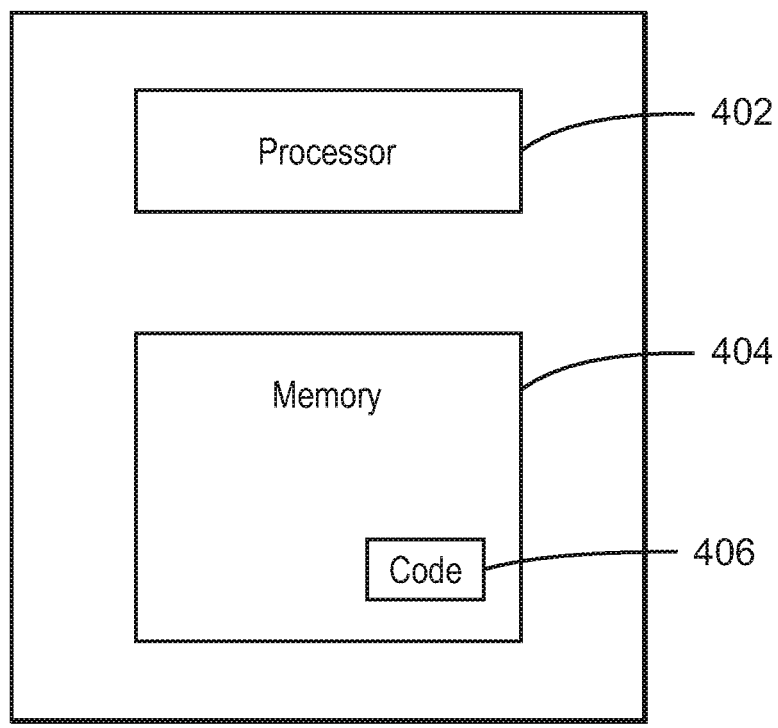
FIG. 4 is a drawing of a computing device for sensor normalization in accordance with embodiments of the present techniques.

FIG. 4 is a computing device 400, such as a cloud computing system or server, IoT gateway device or aggregation device, sensor device, remote computer, on-site server, and the like. While FIG. 4 depicts one computing device 400, embodiments may employ multiple computing devices 400 or a distributed computing system. The computing device 400 includes a processor or hardware processor 402 such as a microprocessor, a central processing unit or CPU, and so forth. The processor 402 may be multiple processors or each processor 402 may have multiple cores. The computing device 400 has memory 404, such as non-volatile memory, volatile memory, and other types of memory. The nonvolatile memory may be a hard drive, read-only-memory or ROM, etc. The volatile memory may be random access memory or RAM, cache, etc.

In the illustrated example, the memory 404 stores code 406, e.g., instructions, logic, etc., executable by the one or more processors 402. The code 406 may be executed by the processor 402 to implement the sensor calibration techniques discussed herein. Further, respective actions may be implemented by different computing devices 400. Also, the computing device 400 may include an application-specific integrated circuit (ASIC) customized for the techniques described.

The computing device 400 may be a computing system for sensor normalization. For example, the code 406 may executable by the processor 402 for the computing system to receive a first value of a characteristic measured by a first sensor, receive a second value of the characteristic measured by a second sensor more accurate than the first sensor, and determine a normalization for the first sensor based on the first value and the second value. The normalization to alter a response equation of the first sensor. The response equation may be sensor output change in response to sensor input change.

The code 406 may be executable by the processor 402 for the computing system to send the normalization to the first sensor to normalize the first sensor including altering the response equation. In some examples, the first sensor may be multiple first sensors, such as IoT sensors. Also, the computing device 400 may be configured for a cloud computing system or as a IoT gateway device, and so forth. Further, the code 406 may be executable by the processor for the computing system to make the normalization available for another sensor (e.g., owned by another user) of a same type as the first sensor, as discussed above.

Figure 5:
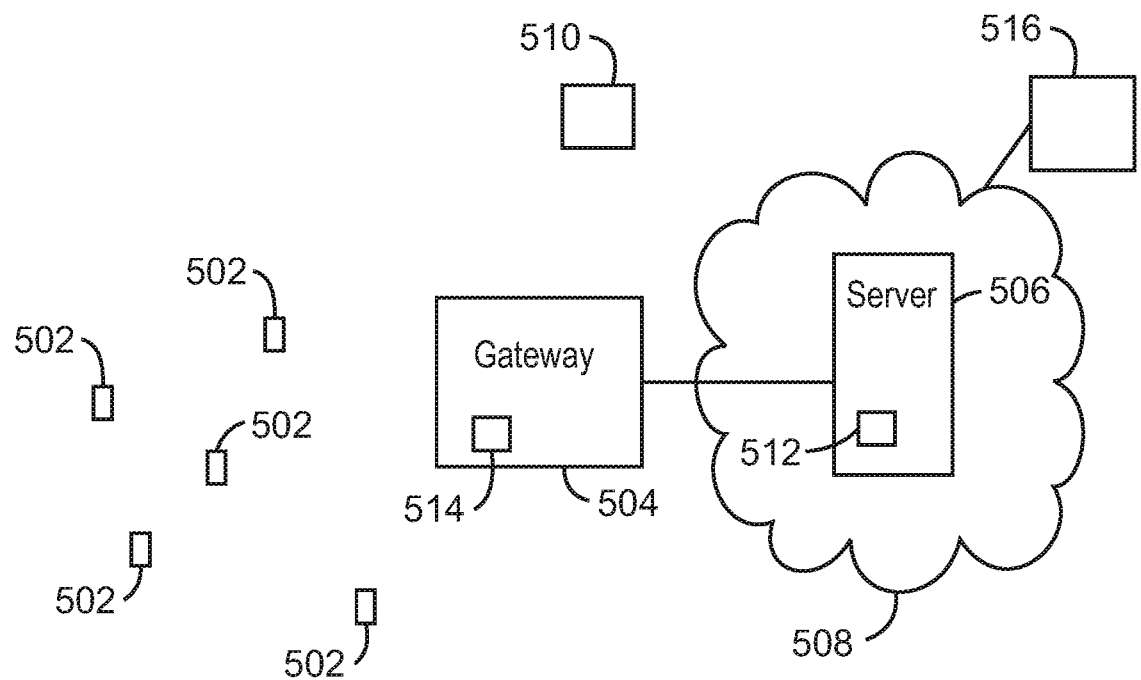
FIG. 5 is a drawing of a system employing multiple sensors in accordance with embodiments of the present techniques.

FIG. 5 is a system 500 for measuring at least one characteristic. The characteristic may be a physical characteristic or feature of an object, an environmental parameter or characteristic, and so on. The system 500 includes at least one first sensor 502 to measure the characteristic. In the illustrated example, multiple first sensors 502 measure the characteristic and send the measured data to one or more gateway devices 504. The sensors 502 may be smart sensors. The first sensors 502 may be wirelessly and/or wired coupled to the gateway device 504. The gateway device 504 may aggregate the data and send the data to a remote computing device such as a server 506 in a cloud infrastructure 508. The server 506 may be a cloud computing device or cloud distributed computing system, and the like. The system 500 may be an IoT system and may include actuators (not shown) dispersed among the first sensors 502.

The system 500 may include or have access to a second sensor 510 that is more accurate at measuring the characteristic than the first sensors 502. The second sensor 510 may be communicatively coupled to the cloud 508 and/or to the gateway device 504. The system 100 may include a third or more types of sensors (not shown) to measure the characteristic. In operation, the first sensor may measure the characteristic at a greater frequency than the second sensor. Moreover, the first sensor may consume less power than the second sensor.

A computing system such as the server 506 and/or the gateway device 504 may determine a normalization of the first sensor based on a measurement of the characteristic by the second sensor 510 that is more accurate than the first sensor. The server 506 and/or the gateway device 504 may include executable code 512 and code 514, respectfully, store in memory to determine the normalization. The computing system may push the normalization to the first sensors 502 to normalize the first sensors 502, wherein the normalization alters a response equation of the first sensors 502 in certain examples. In some embodiments, the gateway device 504, server 506 and/or the cloud 508 provides the normalization to be available for a sensor of a same type as the first sensor external to the system 500. For example, the normalization may be sent to an external system 516 such as another user system or a central entity including an external cloud computing system, manufacturer, service provider, and so forth. The external system 516 may provide the normalization to a user base of the first sensor.

Figure 6:
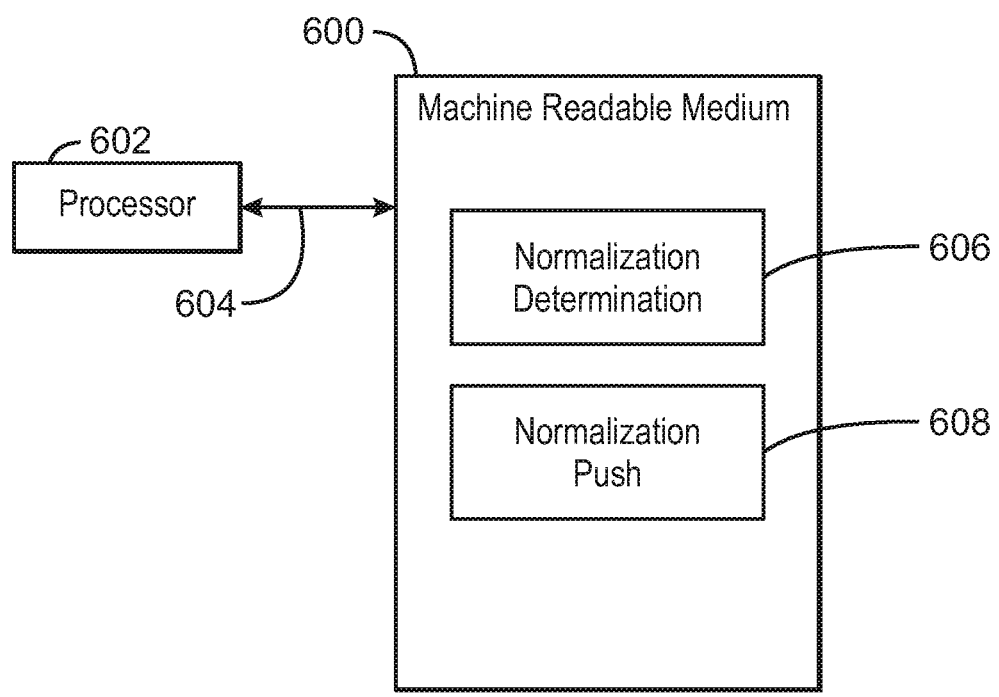
FIG. 6 is a block diagram illustrating a computer-readable medium to facilitate sensor normalization in accordance with embodiments of the present techniques.

FIG. 6 is a block diagram depicting a tangible, non-transitory, computer-readable medium to facilitate sensor normalization. The computer-readable medium 600 may be accessed by a processor 602 over a computer interconnect 604. The processor 602 may be an aggregation device processor, a sensor processor, a server processor, a remote computing device processor, or other processor. The tangible, non-transitory, computer-readable medium 600 may include executable instructions or code to direct the processor 602 to perform the operations of the techniques described herein, such as to determine and implement sensor normalization.

The various software components discussed herein may be stored on the tangible, non-transitory, computer-readable medium 600, as indicated in FIG. 6. For example, a sensor normalization module 606 (executable code/instructions) may direct the processor 602 to implement determining or calculating normalization of a sensor or sensor device including in an IoT network. A normalization push module 608 may provide or make available the normalization to the relevant sensors. The updates may be sorted and applied as batch updates, and the like. It should be understood that any number of additional software components not shown in FIG. 6 may be included within the tangible, non-transitory, computer-readable medium 600, depending on the application.

The sensor normalization module 606 including the code executable by the processor may direct the computing system to receive a first value of a characteristic measured by a first sensor, receive a second value of the characteristic measured by a second sensor more accurate than the first sensor, and determine a normalization for the first sensor based on the first value and the second value, wherein the normalization to alter a response equation of the first sensor. The normalization push module 608 including code executable by the processor for the computing system to make the normalization available for the first sensor to normalize the first sensor including altering the response equation, and wherein the response equation comprises sensor output change in response to sensor input change. The first sensor may be multiple first sensors including IoT sensors, and wherein the computing system may be cloud computing system or an IoT gateway device, and so on.

The normalization push module 608 including code executable by the processor to provide the normalization to be available for other first sensors owned by other users in external systems. In some examples, the normalization may be provided to a central entity, and the central entity sends the normalization or update to systems of other users having the first sensor. Thus, the normalization may be pushed to the user base of sensors of the same or similar type as the first sensor.

It should be noted that the sensors may be ranked or subjected to an ordering, with or without reference to accuracy. Indeed, various desired ordering of sensors may be employed. Thus with a chosen ordering in which the lower-quality sensor is closer (in graph distance) from some central aggregator than the higher-quality sensor, a higher-quality measurement might be mapped into measurements from a lower-quality sensor rather than the other way around discussed above.

In general, given sensors S1 & S2 where S2 is ranked higher than S1, and given measurements (measurement sets) M1 & M2, where M1 measurements were read from S1 and M2 were similarly read from S2, calculation of normalization may create a mapping function F1( ) which takes members of M1 as input and produces corresponding measurements M1' that are suitable for inclusion into the set M2. For example, signal processing or statistical analysis can be performed on the set {M1', M2} as if most or all measurements were in the set M2. Further, given S2 & S3 and M2 & M3, a function F2( ) can be created in a way analogous to the creation of F1( ). This F2( ) maps members of M2 into M2', which is generally suitable for inclusion in M3. This provides a chain whereby the set {M1', M2} can be provided as input to F2( ), resulting in M2', which can travel further up the chain. That in turn provides a way to relate (normalize) data from an entire set of sensors, where the ordering in the set may be based on accuracy (as discussed above), on topology of the sensor network, or other desired ordering.

In general, the internet of things (IoT) includes a paradigm in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, factory automation, smart building, asset tracking/logistics, Operation Technology (OT) with industrial/factory networks, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 7:
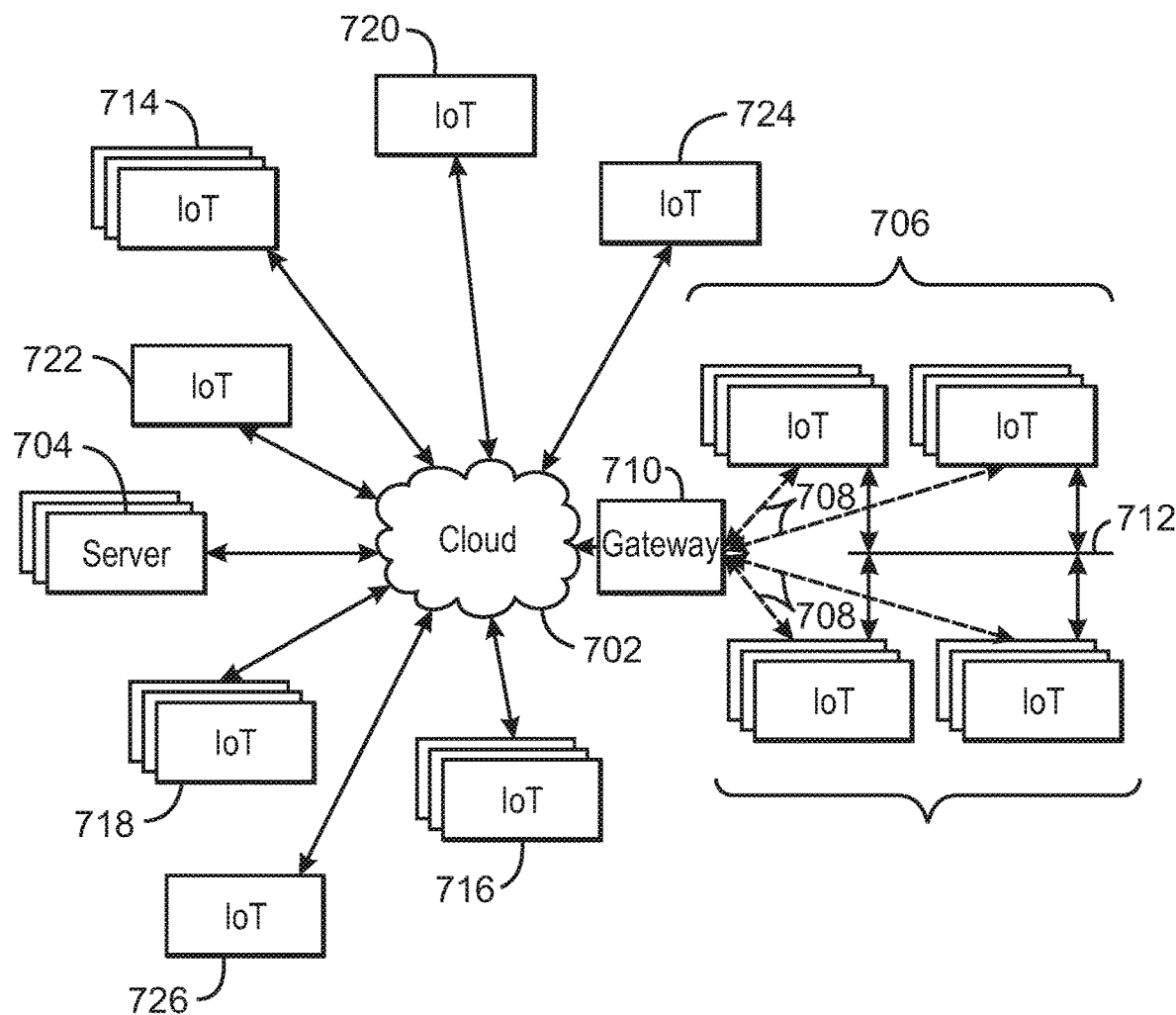
FIG. 7 is a drawing of a cloud computing network, or cloud, in communication with a number of IoT devices in accordance with embodiments of the present techniques.

FIG. 7 is a drawing of a cloud computing network, or cloud 702, in communication with a number of Internet of Things (IoT) devices. The cloud 702 may represent the Internet, or may be a local area network (LAN), or a wide area network (WAN), such as a proprietary network for a company. The cloud 702 may be in contact with one or more servers 704 that may provide command and control functions or consume data from the IoT devices. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 706 through wireless links 708, such as low power wide area (LPWA) links, and the like. Further, a wired or wireless sub-network 712 may allow the IoT devices to communicate with each other, such as a local area network, wireless local area network, and the like. The IoT devices may use another device, such as a gateway 710, which may function as an aggregator or aggregation device, to communicate with the cloud 702.

Other groups of IoT devices may include temperature sensors 714, remote weather stations 716, alarm systems 718, automated teller machines 720, alarm panels 722, or moving vehicles, such as emergency vehicles 724 or drones 726, among many others. Each of these IoT devices may be in communication with other IoT devices, with servers 704, or both.

As can be seen from FIG. 7, a large number of IoT devices may be communicating through the cloud 702. This may allow different IoT devices to request or provide information to other devices autonomously. For example, the traffic control group 706 may request a current weather forecast from a group of remote weather stations 716, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by turning traffic lights to red to block cross traffic at an intersection in sufficient time for the emergency vehicle 724 to have unimpeded access to the intersection.

Clusters of IoT devices, such as the remote weather stations 716 or the traffic control group 706, may be equipped to communicate with other IoT devices as well as with the cloud 702. This may allow the IoT devices to form an ad-hoc network between the devices, allowing them to function as a single device, which may be termed a fog device discussed further with respect to FIG. 8. Moreover, one or more of the sensors in FIG. 7 may be subject to the aforementioned normalization techniques. The normalization determination may be performed by the server 704, a computing device in the cloud, the gateway device 710, a smart sensor, or other computing device.

Figure 8:
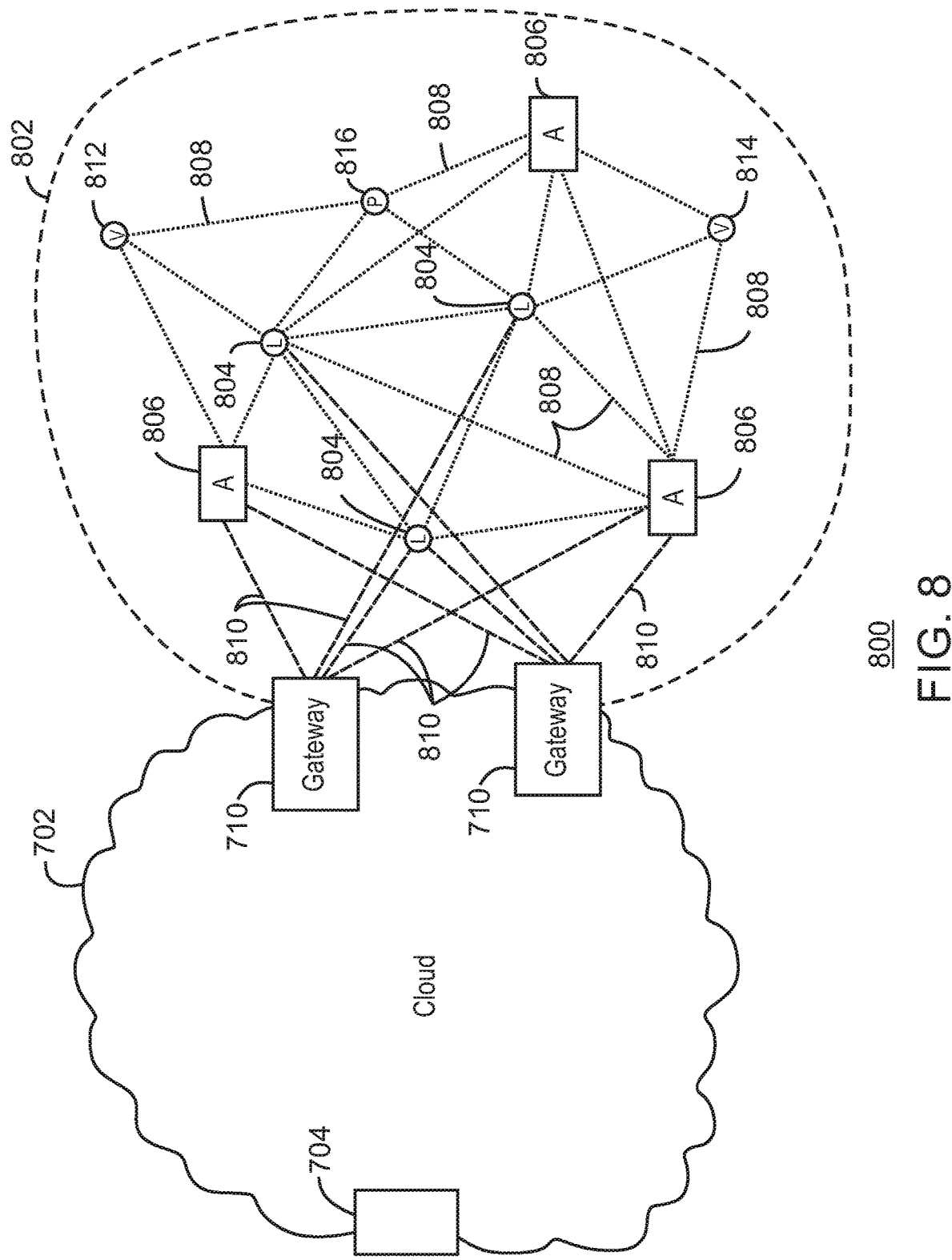
FIG. 8 is a drawing of a cloud computing network, or cloud, in communication with a mesh network of IoT devices, which may be termed a fog device, operating at the edge of the cloud in accordance with embodiments of the present techniques.

FIG. 8 is a drawing 800 of a cloud computing network, or cloud 702, in communication with a mesh network of IoT devices, which may be termed a fog device 802, operating at the edge of the cloud 702. Like numbered items are as described with respect to FIG. 7. In this example, the fog device 802 is a group of IoT devices at a street intersection. The fog device 802 may be established in accordance with specifications released by the OpenFog Consortium (OFC), among others. These specifications allow the formation of a hierarchy of computing elements between the gateways 710 coupling the fog device 802 to the cloud 702 and endpoint devices, such as the traffic lights 804 and the data aggregators 806 in this example.

Traffic flow through the intersection may be controlled by three traffic lights 804 in this example. Analysis of the traffic flow and control schemes may be implemented by aggregators 806 that are in communication with the traffic lights 804 and each other through a mesh network. Data may be uploaded to the cloud 702, and commands may be received from the cloud 702, through gateways 710 that are in communication with the traffic lights 804 and the aggregators 806 through the mesh network.

Any number of communications links may be used in the fog device 802. Shorter-range links 808, for example, compatible with IEEE 802.15.4 may provide local communications between IoT devices that are proximate to the intersection. Longer-range links 810, for example, compatible with LPWA standards, may provide communications between the IoT devices and the gateways 710. To simplify the diagram, not every communications link 808 or 810 is labeled with a reference number.

The fog device 802 may be considered to be a massively interconnected network wherein a number of IoT devices are in communications with each other, for example, by the communication links 808 and 810. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, routing protocol for low-power (RPL), the optimized link state routing (OLSR) protocol, or the better approach to mobile ad-hoc networking (B.A.T.M.A.N.), among many others.

Communications from any IoT device may be passed along the most convenient path between any of the IoT devices to reach the gateways 110. In these networks, the number of interconnections provide substantial redundancy, facilitating communications to be maintained, even with the loss of a number of IoT devices.

Not all of the IoT devices may be permanent members of the fog device 202. In the example in the drawing 800, three transient IoT devices have joined the fog device 802, a first vehicle 812, a second vehicle 814, and a pedestrian 816. In these cases, the IoT device may be built into the vehicles 812 and 814, or may be an App on a cell phone carried by the pedestrian 816.

The fog device 802 of the devices may be presented to clients in the cloud 702, such as the server 704, as a single device located at the edge of the cloud 702. In this example, the control communications to specific resources in the fog device 802 may occur without identifying any specific IoT device within the fog device 802. Accordingly, if an IoT device fails, other IoT devices may be able to discover and control a resource. For example, the traffic lights 804 may be wired so as to allow any one of the traffic lights 804 to control lights for the other traffic lights 204.

In some examples, the IoT devices may be configured using an imperative programming style, e.g., with each IoT device having a specific function and communication partners. However, the IoT devices forming the fog device 802 may be configured in a declarative programming style, allowing the IoT devices to reconfigure their operations and communications, such as to determine needed resources in response to conditions, queries, and device failures. This may be performed as transient IoT devices, such as the pedestrian 816, join the fog device 802. As the pedestrian 816 is likely to travel more slowly than the vehicles 812 and 814, the fog device 802 may reconfigure itself to ensure that the pedestrian 816 has sufficient time to make it through the intersection. This may be performed by forming a temporary group of the vehicles 812 and 814 and the pedestrian 816 to control the traffic lights 804. If one or both of the vehicles 812 or 814 are autonomous, the temporary group may instruct the vehicles to slow down prior to the traffic lights 804.

As the transient devices 812, 814, and 816, leave the vicinity of the intersection the fog device 802, it may reconfigure itself to eliminate those IoT devices from the network. As other transient IoT devices approach the intersection, the fog device 802 may reconfigure itself to include those devices.

The fog device 802 may include the traffic lights 804 for a number of intersections, such as along a street, along with all of the transient IoT devices along the street. The fog device 802 may then divide itself into functional units, such as the traffic lights 804 and other IoT devices proximate to a single intersection. This type of combination may enable the formation of larger IoT constructs in the fog device 802. For example, if an emergency vehicle joins the fog device 802, an emergency construct, or virtual device, may be created that includes all of the traffic lights 804 for the street, allowing control of the traffic flow patterns for the entire street. The emergency construct may instruct the traffic lights 804 along the street to stay red for opposing traffic and green for the emergency vehicle, expediting the passage of the emergency vehicle.

Moreover, one or more of the sensors in FIG. 8 may be subject to the aforementioned normalization techniques. Lastly, many other similar and different configurations and applications unrelated to vehicular traffic are relevant and applicable.

Figure 9:
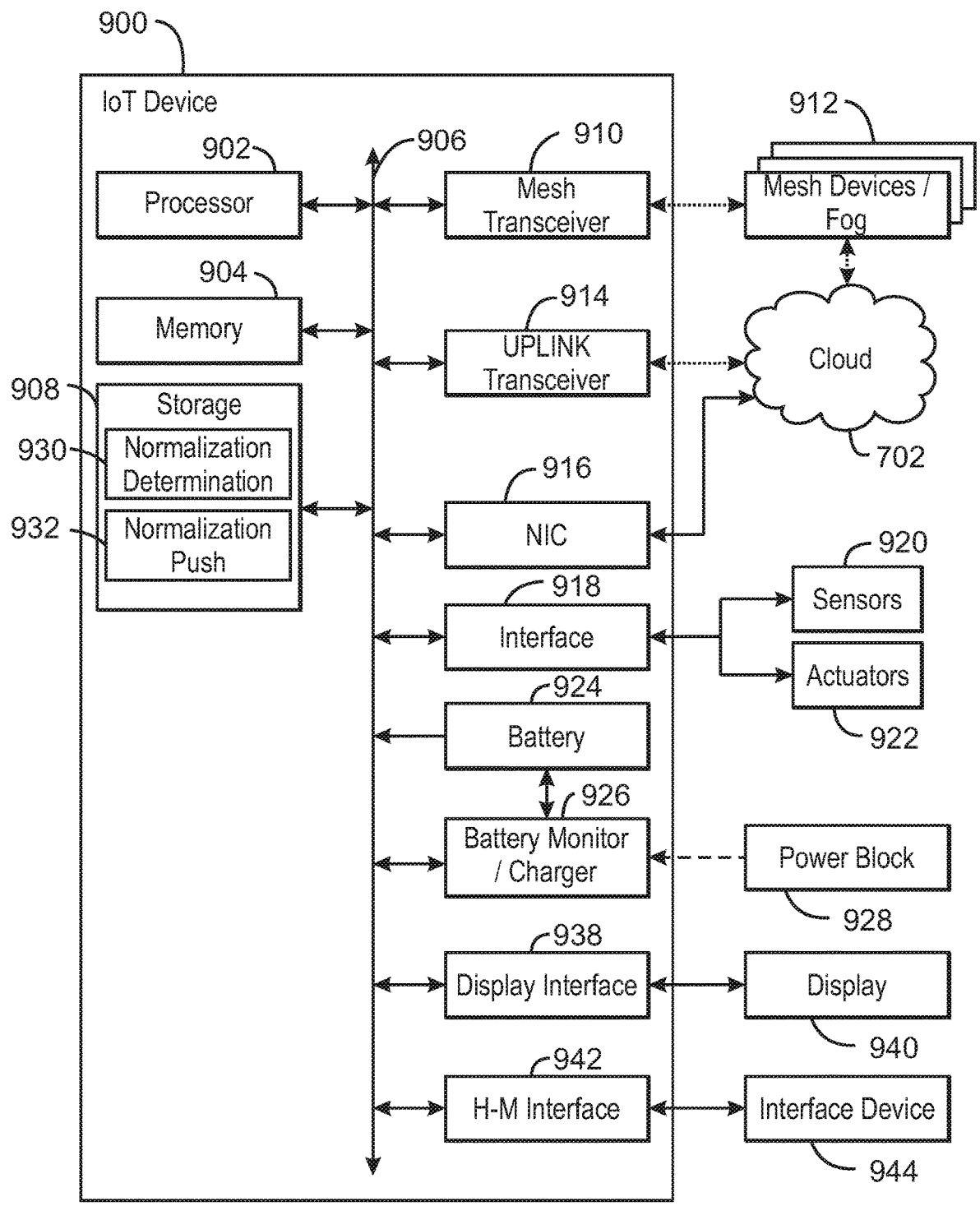
FIG. 9 is a drawing of a computing device in accordance with embodiments of the present techniques.

FIG. 9 is a block diagram of an example of components that may be present in an IoT device 900 of an IoT system. The IoT device 900 may include any combinations of the components shown in the example. The components may be implemented as ICs, portions thereof, discrete electronic devices, or other modules, logic, hardware, software, firmware, or a combination thereof adapted in the IoT device 900, or as components otherwise incorporated within a chassis of a larger system. The block diagram of FIG. 9 is intended to show a high level view of components of the IoT device 900. However, some of the components shown may be omitted, additional components may be present, and different arrangements of the components shown may occur in other implementations.

The IoT device 900 may include a processor 902, which may be a microprocessor, a multi-core processor, a multi-threaded processor, an ultra-low voltage processor, an embedded processor, or other known processing element. The processor 902 may be a part of a system on a chip (SoC) in which the processor 902 and other components are formed into a single integrated circuit, or a single package, such as the Edison™ or Galileo™ SoC boards from Intel. As an example, the processor 902 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as those available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

The processor 902 may communicate with a system memory 904 over a bus 906. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 908 may also couple to the processor 902 via the bus 906. To enable a thinner and lighter system design, the mass storage 908 may be implemented via a solid state disk drive (SSDD). Other devices that may be used for the mass storage 908 include flash memory cards, such as SD cards, microSD cards, xD picture cards, and the like, and USB flash drives. In low power implementations, the mass storage 908 may be on-die memory or registers associated with the processor 902. However, in some examples, the mass storage 908 may be implemented using a micro hard disk drive (HDD). Further, any number of new technologies may be used for the mass storage 908 in addition to, or instead of, the technologies described, such as resistance change memories, phase change memories, holographic memories, or chemical memories, among others. For example, the IoT device 900 may incorporate the 3D XPOINT memories from Intel® and Micron®.

The components may communicate over the bus 906. The bus 906 may include any number of technologies, including industry standard architecture (ISA), extended ISA (EISA), peripheral component interconnect (PCI), peripheral component interconnect extended (PCIx), PCI express (PCIe), or any number of other technologies. The bus 906 may be a proprietary bus, for example, used in a SoC based system. Other bus systems may be included, such as an I2C interface, an SPI interface, point to point interfaces, and a power bus, among others.

The bus 906 may couple the processor 902 to a mesh transceiver 710, for communications with other mesh devices 912. The mesh transceiver 910 may use any number of frequencies and protocols, such as 2.4 gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 912. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, can occur via a WWAN unit.

The mesh transceiver 910 may communicate using multiple standards or radios for communications at different ranges. For example, the IoT device 900 may communicate with close devices, e.g., within about 10 meters, using a local transceiver based on BLE, or another low power radio, to save power. More distant mesh devices 912, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee. The mesh transceiver 910 may be incorporated into an MCU as an address directly accessible by the chip, such as in the Curie® units available from Intel.

An uplink transceiver 914 may be included to communicate with devices in the cloud 102. The uplink transceiver 914 may be LPWA transceiver that follows the IEEE 802.15.4, or IEEE 802.15.4g standards, among others. The IoT device 900 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in IEEE 802.15.4e may be used.

Any number of other radio communications and protocols may be used in addition to the systems mentioned for the mesh transceiver 910 and uplink transceiver 914, as described herein. For example, the radio transceivers 910 and 912 may include an LTE or other cellular transceiver that uses spread spectrum (SPA/SAS) communications for implementing high speed communications, such as for video transfers. Further, any number of other protocols may be used, such as Wi-Fi networks for medium speed communications, such as still pictures, sensor readings, and provision of network communications.

The radio transceivers 910 and 914 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). Cellular standards such as LTE-machine-type communication (LTE-M), LTE-narrowband (LTE-NB), or variations thereof, may be applicable. It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autor-adiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 914, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 916 may be included to provide a wired communication to the cloud 102. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 916 may be included to allow connection to a second network, for example, a NIC 916 providing communications to the cloud over Ethernet, and a second NIC 916 providing communications to other devices over another type of network.

With respect to representation of NIC, uplink, and mesh transceiver, in the general case for QW node there may be at least two physical interfaces. One interface for the low power mesh (e.g. IEEE 802.15.4) which may have mesh and routing capability as part of the stack. A second physical interface may have internet protocol (IP) connectivity that performs the "uplink" reporting of data to a cloud entity.

The bus 906 may couple the processor 902 to an interface 918 that may be used to connect external devices. The external devices may include sensors 920, such as accelerometers, level sensors, flow sensors, temperature sensors, pressure sensors, barometric pressure sensors, and the like. The interface 918 may be used to connect the IoT device 900 to actuators 922, such as power switches, valve actuators, an audible sound generator, a visual warning device, and the like.

While not shown, various input/output (I/O) devices may be present within, or connected to, the IoT device 900. For example, a display may be included to show information, such as sensor readings or actuator position. An input device, such as a touch screen or keypad may be included to accept input.

Indeed, the IoT device 900 may have one or more I/O interfaces, such as a display interface 938 and a human-machine (HM) interface 942. The display interface 938 may accommodate video, as well as audio. In the illustrated example, a display 940 may be coupled to the display interface 938. The display 940 may provide for display of data including IoT data collected via IoT systems. The display 940 may incorporate technologies such as liquid crystal display (LCD), light emitting diodes (LED), organic LED (OLED), gas-plasma, and so forth. The display 940 can be a simple display or a more complex display. The display 940 may be an interactive display and accommodate user input. In some examples, the display 940 may have a touch screen for user input. The display 940 may have knobs or push buttons, and be configured with virtual icons, selectable or multi-touch menus, a graphical user interface (GUI), and so forth.

An interface device 944 may be coupled to the HM interface 942 (HMI). The interface device 944 may include a touchscreen, mouse, keyboards, buttons, and the like. The HM interface 942 may include a hardware and code to accommodate human interaction and input. Moreover, while the display 940 and the interface device 944 are depicted as coupled to or part of the IoT device 900, various nodes and devices throughout IoT systems can be coupled to or associated with a display device or interface device for the display of IoT data and for human interaction.

A battery 924 may power the IoT device 900, although in examples in which the IoT device 900 is mounted in a fixed location, it may have a power supply coupled to an electrical grid. The battery 924 may be a lithium ion battery, a metal-air battery, such as a zinc-air battery, an aluminum-air battery, a lithium-air battery, and the like.

A battery monitor/charger 926 may be included in the IoT device 900 to track the state of charge (SoCh) of the battery 924. The battery monitor/charger 926 may be used to monitor other parameters of the battery 924 to provide failure predictions, such as the state of health (SoH) and the state of function (SoF) of the battery 924. The battery monitor/charger 926 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 926 may communicate the information on the battery 924 to the processor 902 over the bus 906. The battery monitor/charger 926 may also include an analog-to-digital (ADC) convertor that allows the processor 902 to directly monitor the voltage of the battery 924 or the current flow from the battery 924. The battery parameters may be used to determine actions that the IoT device 900 may perform, such as transmission frequency, mesh network operation, sensing frequency, and the like. This may be related back to the failure operations being performed discussed above.

A power block 928, or other power supply coupled to a grid, may be coupled with the battery monitor/charger 926 to charge the battery 924. In some examples, the power block 928 may be replaced with a wireless power receiver to obtain the power wirelessly, for example, through a loop antenna in the IoT device 900. A wireless battery charging circuit, such as an LTC4020 chip from Linear Technologies of Milpitas, Calif., among others, may be included in the battery monitor/charger 926. The specific charging circuits chosen depend on the size of the battery 924, and thus, the current required. The charging may be performed using the Airfuel standard promulgated by the Airfuel Alliance, the Qi wireless charging standard promulgated by the Wireless Power Consortium, the Rezence charging standard, promulgated by the Alliance for Wireless Power, among others.

The mass storage 908 may include a number of modules to implement the sensor normalization described herein, as indicated by reference numerals 930 and, 932. Block 930 may be executable code to determine or calculate the normalization, as discussed. Block 932 executable code to make available or push the normalization to the sensor.

Although shown as code blocks in the mass storage 908, it may be understood that any of the modules may be replaced with hardwired circuits, for example, built into an application specific integrated circuit (ASIC). The mass storage 908 may further include and store other functional blocks, such as a control UI for accessing configuration parameters, and an automation framework that may provide application program interfaces (APIs) for the interaction of canned trigger scripts. Other functional blocks that may be present include accelerated processing units (APUs) in the automation framework that exchange a standard set of timing information that allows trigger scripts to identify synchronous versus staggered starts. An IoT database may be includes to store workflow configuration information, observed system performance, and resulting solution characteristics. Interactions with the IoT database may be via the control UI.

In the description and claims, the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit or receive signals, among others.

An embodiment is an implementation or example. Reference in the specification to "an embodiment", "one embodiment", "some embodiments", "various embodiments", or "other embodiments" means that a particular feature, structure, or characteristic described in connection with the embodiments is included in at least some embodiments, but not necessarily all embodiments, of the present techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can", or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement or order of circuit elements or other features illustrated in the drawings or described herein need not be arranged in the particular way illustrated and described. Many other arrangements are possible according to some embodiments.

In each system shown in a figure, the elements in some cases may each have a same reference number or a different reference number to suggest that the elements represented could be different or similar. However, an element may be flexible enough to have different implementations and work with some or all of the systems shown or described herein. The various elements shown in the figures may be the same or different. Which one is referred to as a first element and which is called a second element is arbitrary.

Examples are provided. Example 1 is a method of sensor normalization by a computing system. The method includes receiving at the computing system a first value of a characteristic measured by a first sensor; receiving at the computing system a second value of the characteristic measured by a second sensor more accurate than the first sensor; determining by the computing system a normalization for the first sensor based on the first value and the second value, wherein the normalization to alter a response equation of the first sensor; and providing the normalization to be available for another sensor of a same type as the first sensor.

Example 2 includes the method of example 1, including or excluding optional features. In this example, the method includes sending the normalization to the first sensor; and normalizing the first sensor by altering the response equation per the normalization.

Example 3 includes the method of any one of examples 1 to 2, including or excluding optional features. In this example, the response equation comprises sensor output as a function of sensor input, and wherein the first sensor is operated by a first user and the another sensor is operated by another user different than the first user.

Example 4 includes the method of any one of examples 1 to 3, including or excluding optional features. In this example, the first sensor comprises multiple first sensors comprising Internet-of-Things (IoT) sensors, and wherein the first sensor is operated by a first user and the another sensor is operated by a second user different than the first user.

Example 5 includes the method of any one of examples 1 to 4, including or excluding optional features. In this example, the computing system comprises a user computing system, a cloud computing system, or an IoT gateway device, or any combination thereof.

Example 6 includes the method of any one of examples 1 to 5, including or excluding optional features. In this example, the first sensor measures the characteristic more frequently than the second sensor.

Example 7 includes the method of any one of examples 1 to 6, including or excluding optional features. In this example, the first sensor consumes less power than the second sensor.

Example 8 includes the method of any one of examples 1 to 7, including or excluding optional features. In this example, providing the normalization to be available for the another sensor comprises sending the normalization to a manufacturer or service-provider of the first sensor, and wherein the manufacturer or service-provider to send the normalization to a system comprising the another sensor.

Example 9 includes the method of any one of examples 1 to 8, including or excluding optional features. In this example, the method includes normalizing the another sensor based on the normalization, wherein the first sensor is operated by a first user and the another sensor is operated by a second user different than the first user.

Example 10 is a computing system for sensor normalization. The computing system includes a processor; and memory storing code executable by the processor to: receive a first value of a characteristic measured by a first sensor operated by a first user; receive a second value of the characteristic measured by a second sensor more accurate than the first sensor; determine a normalization for the first sensor based on the first value and the second value, wherein the normalization to alter a response equation of the first sensor; and make available the normalization for a third sensor of a same type as the first sensor and operated by a second user different than the first user.

Example 11 includes the computing system of example 10, including or excluding optional features. In this example, the code executable by the processor to send the normalization to the first sensor to normalize the first sensor comprising altering the response equation.

Example 12 includes the computing system of any one of examples 10 to 11, including or excluding optional features. In this example, the first sensor comprises multiple first sensors comprising Internet-of-Things (IoT) sensors, and wherein the response equation comprises sensor output change in response to sensor input change.

Example 13 includes the computing system of any one of examples 10 to 12, including or excluding optional features. In this example, the computing system is configured for a cloud computing system or as a IoT gateway device.

Example 14 includes the computing system of any one of examples 10 to 13, including or excluding optional features. In this example, to make the normalization available for the third sensor comprises to send the normalization to a central entity, and wherein the central entity to send the normalization to a system comprising the third sensor.

Example 15 includes the computing system of any one of examples 10 to 14, including or excluding optional features. In this example, to make the normalization available for the third sensor comprises to send the normalization to the third sensor to normalize the third sensor.

Example 16 is a system for measuring a characteristic. The system includes a first sensor to measure the characteristic to give a first value; a computing system to determine a normalization of the first sensor based on the first value and on a second value of the characteristic measured by a second sensor more accurate than the first sensor, wherein the system to make available the normalization for another sensor external to the system and of a same type as the first sensor.

Example 17 includes the system of example 16, including or excluding optional features. In this example, the first sensor to measure the characteristic at a greater frequency than the second sensor, wherein the first sensor to consume less power than the second sensor, and wherein the normalization to alter a response function of the first sensor.

Example 18 includes the system of any one of examples 16 to 17, including or excluding optional features. In this example, the computing system to push the normalization to the first sensor to normalize the first sensor.

Example 19 includes the system of any one of examples 16 to 18, including or excluding optional features. In this example, the system includes the second sensor.

Example 20 includes the system of any one of examples 16 to 19, including or excluding optional features. In this example, the system comprises an IoT system and the first sensor comprises multiple first sensors comprising IoT sensors to measure the characteristic and forward measured data to an IoT gateway device, wherein the system comprises the IoT gateway device to receive the measured data and provide the measured data to a cloud infrastructure, and wherein the computing system comprises a cloud computing system or the IoT gateway device.

Example 21 includes the system of any one of examples 16 to 20, including or excluding optional features. In this example, the first sensor to be operated by a first user and the another sensor operated by a second user different than the first user.

Example 22 includes the system of any one of examples 16 to 21, including or excluding optional features. In this example, to make available the normalization comprises to provide the normalization to a central entity, and wherein the central entity to provide the normalization to another system comprising the another sensor.

Example 23 is a tangible, non-transitory, computer-readable medium. The computer-readable medium includes instructions that direct the processor to receive a first value of a characteristic measured by a first sensor operated by a first user in a system; receive a second value of the characteristic measured by a second sensor more accurate than the first sensor; determine a normalization for the first sensor based on the first value and the second value, wherein the normalization to alter a response equation of the first sensor; and make the normalization available for another system for normalization of another sensor of a same type as the first sensor and external to the system, the another sensor operated by a second user different than the first user.

Example 24 includes the computer-readable medium of example 23, including or excluding optional features. In this example, the response equation comprises sensor output change in response to sensor input change, and wherein the another system comprises a central entity or a system of the second user.

Example 25 includes the computer-readable medium of any one of examples 23 to 24, including or excluding optional features. In this example, the first sensor comprises multiple first sensors comprising Internet-of-Things (IoT) sensors, and wherein the computing system comprises cloud computing system or an IoT gateway device.

Example 26 is a method of sensor normalization by a computing system. The method includes instructions that direct the processor to receiving at the computing system a first value of a characteristic measured by a first sensor; receiving at the computing system a second value of the characteristic measured by a second sensor more accurate than the first sensor; determining by the computing system a normalization for the first sensor based on the first value and the second value, wherein the normalization to alter a response equation of the first sensor; and providing the normalization to be available for another sensor of a same type as the first sensor, wherein the first sensor is operated by a first user and the another sensor is operated by another user different than the first user.

Example 27 includes the method of example 26, including or excluding optional features. In this example, the response equation comprises sensor output as a function of sensor input, wherein the first sensor comprises multiple first sensors comprising Internet-of-Things (IoT) sensors.

Example 28 includes the method of any one of examples 26 to 27, including or excluding optional features. In this example, the computing system comprises a user computing system, a cloud computing system, or an IoT gateway device, or any combination thereof.

Example 29 includes the method of any one of examples 26 to 28, including or excluding optional features. In this example, the first sensor measures the characteristic more frequently than the second sensor.

Example 30 includes the method of any one of examples 26 to 29, including or excluding optional features. In this example, the first sensor consumes less power than the second sensor.

Example 31 includes the method of any one of examples 26 to 30, including or excluding optional features. In this example, providing the normalization to be available for the another sensor comprises sending the normalization to a manufacturer or service-provider of the first sensor, and wherein the manufacturer or service-provider to send the normalization to a system comprising the another sensor.

Example 32 is a system for sensor normalization. The system includes instructions that direct the processor to means for receiving at a computing system a first value of a characteristic measured by a first sensor; means for receiving at the computing system a second value of the characteristic measured by a second sensor more accurate than the first sensor; means for determining by the computing system a normalization for the first sensor based on the first value and the second value, wherein the normalization to alter a response equation of the first sensor; and means for providing the normalization to be available for another sensor of a same type as the first sensor.

Example 33 includes the system of example 32, including or excluding optional features. In this example, the system includes means for sending the normalization to the first sensor; and means for normalizing the first sensor by altering the response equation per the normalization.

Example 34 includes the system of any one of examples 32 to 33, including or excluding optional features. In this example, the response equation comprises sensor output as a function of sensor input, and wherein the first sensor is operated by a first user and the another sensor is operated by another user different than the first user.

Example 35 includes the system of any one of examples 32 to 34, including or excluding optional features. In this example, the first sensor comprises multiple first sensors comprising Internet-of-Things (IoT) sensors, and wherein the first sensor is operated by a first user and the another sensor is operated by a second user different than the first user.

Example 36 includes the system of any one of examples 32 to 35, including or excluding optional features. In this example, the computing system comprises a user computing system, a cloud computing system, or an IoT gateway device, or any combination thereof.

Example 37 includes the system of any one of examples 32 to 36, including or excluding optional features. In this example, the first sensor measures the characteristic more frequently than the second sensor.

Example 38 includes the system of any one of examples 32 to 37, including or excluding optional features. In this example, the first sensor consumes less power than the second sensor.

Example 39 includes the system of any one of examples 32 to 38, including or excluding optional features. In this example, the means for providing the normalization to be available for the another sensor comprises means for sending the normalization to a manufacturer or service-provider of the first sensor, and wherein the manufacturer or service-provider to send the normalization to a system comprising the another sensor.

Example 40 includes the system of any one of examples 32 to 39, including or excluding optional features. In this example, the system includes means for normalizing the another sensor based on the normalization, wherein the first sensor is operated by a first user and the another sensor is operated by a second user different than the first user.

Example 41 is a system for sensor normalization. The system includes instructions that direct the processor to means for receiving at a computing system a first value of a characteristic measured by a first sensor; means for receiving at the computing system a second value of the characteristic measured by a second sensor more accurate than the first sensor; means for determining by the computing system a normalization for the first sensor based on the first value and the second value, wherein the normalization to alter a response equation of the first sensor; and means for providing the normalization to be available for another sensor of a same type as the first sensor, wherein the first sensor is operated by a first user and the another sensor is operated by another user different than the first user.

Example 42 includes the system of example 41, including or excluding optional features. In this example, the response equation comprises sensor output as a function of sensor input, wherein the first sensor comprises multiple first sensors comprising Internet-of-Things (IoT) sensors.

Example 43 includes the system of any one of examples 41 to 42, including or excluding optional features. In this example, the computing system comprises a user computing system, a cloud computing system, or an IoT gateway device, or any combination thereof.

Example 44 includes the system of any one of examples 41 to 43, including or excluding optional features. In this example, the first sensor measures the characteristic more frequently than the second sensor.

Example 45 includes the system of any one of examples 41 to 44, including or excluding optional features. In this example, the first sensor consumes less power than the second sensor.

Example 46 includes the system of any one of examples 41 to 45, including or excluding optional features. In this example, the means for providing the normalization to be available for the another sensor comprises means for sending the normalization to a manufacturer or service-provider of the first sensor, and wherein the manufacturer or service-provider to send the normalization to a system comprising the another sensor.

Example 47 is a tangible, non-transitory, computer-readable medium. The computer-readable medium includes instructions that direct the processor to receive a first value of a characteristic measured by a first sensor in a system, the first sensor owned by a first user; receive a second value of the characteristic measured by a second sensor more accurate than the first sensor; determine a normalization for the first sensor based on the first value and the second value, wherein the normalization to alter a response equation of the first sensor; and provide the normalization to be available for another system for normalization of third sensor of a same type as the first sensor, the third sensor owned by a second user different than the first user.

Example 48 includes the computer-readable medium of example 47, including or excluding optional features. In this example, the response equation comprises sensor output change in response to sensor input change.

Example 49 includes the computer-readable medium of any one of examples 47 to 48, including or excluding optional features. In this example, the first sensor comprises multiple first sensors comprising Internet-of-Things (IoT) sensors.

Example 50 includes the computer-readable medium of any one of examples 47 to 49, including or excluding optional features. In this example, the computing system comprises cloud computing system or an IoT gateway device.

Example 51 includes the computer-readable medium of any one of examples 47 to 50, including or excluding optional features. In this example, the first sensor measures the characteristic more frequently than the second sensor.

Example 52 includes the computer-readable medium of any one of examples 47 to 51, including or excluding optional features. In this example, the first sensor consumes less power than the second sensor.

Example 53 includes the computer-readable medium of any one of examples 47 to 52, including or excluding optional features. In this example, to provide the normalization to be available for another system comprises to provide the normalization to a central entity, and wherein the central entity to provide the normalization to the another system.

Example 54 is a method of sensor normalization by a computing system. The method includes instructions that direct the processor to receiving at the computing system a first value of a parameter measured by a first sensor; receiving at the computing system a second value of the parameter measured by a second sensor more accurate than the first sensor; determining by the computing system a normalization for the first sensor based on the first value and the second value, wherein the normalization to alter a response function of the first sensor; and making the normalization available for a third sensor of a same type as the first sensor.

Example 55 includes the method of example 54, including or excluding optional features. In this example, the method includes sending the normalization to the first sensor.

Example 56 includes the method of any one of examples 54 to 55, including or excluding optional features. In this example, the method includes normalizing the first sensor by altering the response function per the normalization.

Example 57 includes the method of any one of examples 54 to 56, including or excluding optional features. In this example, the response function comprises sensor output as a function of sensor input.

Example 58 includes the method of any one of examples 54 to 57, including or excluding optional features. In this example, the first sensor comprises an Internet-of-Things (IoT) sensor.

Example 59 includes the method of any one of examples 54 to 58, including or excluding optional features. In this example, the first sensor comprises multiple first sensors comprising IoT sensors.

Example 60 includes the method of any one of examples 54 to 59, including or excluding optional features. In this example, the first sensor is owned by a first user and the third sensor is owned by a second user different than the first user.

Example 61 includes the method of any one of examples 54 to 60, including or excluding optional features. In this example, the first sensor is operated by a first user and the third sensor is operated by a second user different than the first user.

Example 62 includes the method of any one of examples 54 to 61, including or excluding optional features. In this example, the computing system comprises a user computing system, a cloud computing system, or an IoT gateway device, or any combination thereof.

Example 63 includes the method of any one of examples 54 to 62, including or excluding optional features. In this example, the method includes measuring the parameter more frequently than the second sensor measures the parameter.

Example 64 includes the method of any one of examples 54 to 63, including or excluding optional features. In this example, the first sensor consumes less power than the second sensor.

Example 65 includes the method of any one of examples 54 to 64, including or excluding optional features. In this example, making the normalization available comprises sending the normalization to a central entity. Optionally, the central entity to provide the normalization to a system comprising the third sensor.

Example 66 includes the method of any one of examples 54 to 65, including or excluding optional features. In this example, the method includes normalizing the third sensor based on the normalization.

It is to be understood that specifics in the aforementioned examples may be used anywhere in one or more embodiments. For instance, all optional features of the computing device described above may also be implemented with respect to either of the methods described herein or a computer-readable medium.

Furthermore, although flow diagrams or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method of sensor normalization by a computing system, comprising:
   receiving at the computing system a first value of a characteristic measured by a first sensor of a first sensor type;
   receiving at the computing system a second value of the characteristic measured by a second sensor of a second sensor type that is more accurate than the first sensor type;
   determining by the computing system a normalization for the first sensor based, at least in part, on the first value and the second value, wherein the normalization alters a response equation of the first sensor; and
   normalizing a sensor of a same type as the first sensor, based, at least in part, on the normalization.

2. The method of claim 1, comprising:
   sending the normalization to the first sensor; and
   normalizing the first sensor by altering the response equation per the normalization, wherein the second sensor is a different type of sensor than the first sensor.

3. The method of claim 1, wherein the response equation comprises sensor output as a function of sensor input, and wherein the first sensor is operated by a first user and the sensor of the same type as the first sensor is operated by another user different than the first user.

4. The method of claim 1, wherein the first sensor comprises multiple first sensors comprising Internet-of-Things (IoT) sensors, and wherein the first sensor is operated by a first user and the sensor of the same type as the first sensor is operated by a second user different than the first user.

5. The method of claim 1, wherein the computing system comprises a user computing system, a cloud computing system, or an IoT gateway device, or any combination thereof.

6. The method of claim 1, wherein the first sensor measures the characteristic more frequently than the second sensor.

7. The method of claim 1, wherein the first sensor consumes less power than the second sensor.

8. The method of claim 1, wherein normalizing the sensor of the same type as the first sensor comprises sending the normalization to a manufacturer or service-provider of the first sensor, and wherein the manufacturer or service-provider to send the normalization to a system comprising the sensor of the same type as the first sensor.

9. The method of claim 1, comprising normalizing the sensor of the same type as the first sensor based on the normalization, wherein the first sensor is operated by a first user and the sensor of the same type as the first sensor is operated by a second user different than the first user.

10. A computing system for sensor normalization, comprising:
    a processor; and
    memory storing code executable by the processor to:
      receive a first value of a characteristic measured by a first sensor of a first sensor type operated by a first user;
      receive a second value of the characteristic measured by a second sensor of a second type that is more accurate than the first sensor type;
      determine a normalization for the first sensor based, at least in part, on the first value and the second value, wherein the normalization to alter a response equation of the first sensor; and
      normalize a third sensor of a same type as the first sensor and operated by a second user different than the first user.

11. The computing system of claim 10, wherein the code executable by the processor to send the normalization to the first sensor to normalize the first sensor comprising altering the response equation, wherein the first sensor comprises a first type of sensor, and wherein the second sensor comprises a second type of sensor different than the first sensor.

12. The computing system of claim 10, wherein the first sensor comprises multiple first sensors comprising Internet-of-Things (IoT) sensors, and wherein the response equation comprises sensor output change in response to sensor input change.

13. The computing system of claim 10, wherein the computing system is configured for a cloud computing system or as an IoT gateway device.

14. The computing system of claim 10, wherein to normalize the third sensor comprises to send the normalization to a central entity, and wherein the central entity to send the normalization to a system comprising the third sensor.

15. The computing system of claim 10, wherein to normalize the third sensor comprises to send the normalization to the third sensor to normalize the third sensor.

16. A system for measuring a characteristic, comprising:
    a first sensor of a first sensor type to measure the characteristic to give a first value;
    a computing system to determine a normalization of the first sensor based on the first value and on a second value of the characteristic measured by a second sensor of a second sensor type that is more accurate than the first sensor type, wherein the system is to provide the normalization to an Internet-of-Things (IoT) device for normalizing a sensor of a same type as the first sensor.

17. The system of claim 16, wherein the first sensor is to measure the characteristic at a greater frequency than the second sensor, wherein the first sensor consumes less power than the second sensor, and wherein the normalization-alters a response function of the first sensor.

18. The system of claim 16, wherein the computing system is to push the normalization to the first sensor to normalize the first sensor, and wherein the first sensor comprises a first type of sensor.

19. The system of claim 16, wherein the IoT device comprises only the second sensor.

20. The system of claim 16, wherein the system comprises an IoT system and the first sensor comprises multiple first sensors comprising IoT sensors to measure the characteristic and forward measured data to an IoT gateway device, wherein the system comprises the IoT gateway device to receive the measured data and provide the measured data to a cloud infrastructure, and wherein the computing system comprises a cloud computing system or the IoT gateway device.

21. The system of claim 16, wherein the first sensor to be operated by a first user and the sensor of the same type as the first sensor to be operated by a second user different than the first user.

22. The system of claim 16, wherein to make available the normalization comprises to provide the normalization to a central entity, and wherein the central entity to provide the normalization to another system comprising the sensor of the same type as the first sensor.

23. A tangible, non-transitory, computer-readable medium comprising code executable by a processor of computing system to direct the computing system to:
  receive a first value of a characteristic measured by a first sensor of a first sensor type operated by a first user in a system;
  receive a second value of the characteristic measured by a second sensor of a second sensor type that is more accurate than the first sensor type;
  determine a normalization for the first sensor type based on the first value and the second value, wherein the normalization alters a response equation of the first sensor type; and
  provide the normalization to another system for normalization of another sensor of the first sensor type and external to the system, the another sensor operated by a second user different than the first user.

24. The tangible, non-transitory, computer-readable medium of claim 23, wherein the response equation comprises sensor output change in response to sensor input change, and wherein the another system comprises a central entity or a system of the second user.

25. The tangible, non-transitory, computer-readable medium of claim 23, wherein the first sensor comprises multiple first sensors comprising Internet-of-Things (IoT) sensors, wherein the computing system comprises cloud computing system or an IoT gateway device, and wherein the second sensor is a different type of sensor than the first sensor.

* * * * *